(12) United States Patent
Narayanan et al.

(10) Patent No.: US 8,532,171 B1
(45) Date of Patent: Sep. 10, 2013

(54) MULTIPLE STREAM ADAPTIVE BIT RATE SYSTEM

(75) Inventors: Karthik Narayanan, Chennai (IN); Zubair Visharam, Santa Clara, CA (US); Sunil Mukundan, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 327 days.

(21) Appl. No.: 12/978,384

(22) Filed: Dec. 23, 2010

(51) Int. Cl.
*H04N 7/12* (2006.01)

(52) U.S. Cl.
USPC .................................................. 375/240.01

(58) Field of Classification Search
USPC .................................................. 375/240.01
See application file for complete search history.

(56) References Cited

U.S. PATENT DOCUMENTS

2003/0235390 A1* 12/2003 Nygren et al. ................. 386/46
2004/0125877 A1* 7/2004 Chang et al. ............. 375/240.28

* cited by examiner

*Primary Examiner* — Christopher S Kelley
*Assistant Examiner* — Zhen Jessica Li
(74) *Attorney, Agent, or Firm* — Harrity & Harrity, LLP

(57) ABSTRACT

A method and apparatus for segmenting multiple live media streams of differing qualities into a single output stream. The live media streams may have constant or unpredictable key frame intervals.

36 Claims, 9 Drawing Sheets

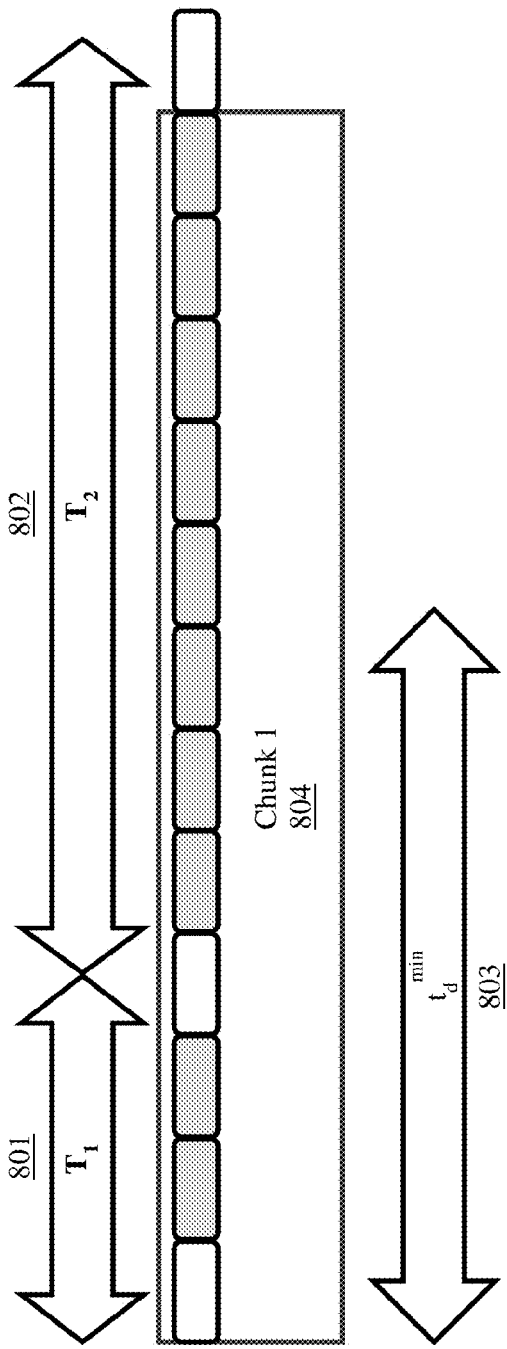
Fig. 8

MULTIPLE STREAM ADAPTIVE BIT RATE SYSTEM

TECHNICAL FIELD

The present disclosure generally relates to media content delivery.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

The traditional video delivery domain has been plagued with problems surrounding latency, buffering, and the unpredictable nature of the last mile bandwidth. These problems provide consumers with a very poor quality of viewing experience. Many different approaches that allow for adaptive bit rate delivery have been introduced in the last few years geared towards solving these issues.

For example, Adobe Systems, Inc. of San Jose, Calif., has implemented an adaptive HTTP-based streaming solution using fragmented MP4 for the Flash player. Microsoft Corporation of Seattle, Wash., has a similar solution using fragmented MP4 for its Silverlight player. Apple, Inc. of Cupertino, Calif., utilizes a segmented MPEG2-TS solution for its iPhone/iPod, iOS, and QT-X players. Each approach attempts to provide a smooth and uninterrupted viewing experience to an end-viewer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 illustrates a chunking mechanism for media streams with unbounded, inconsistent time intervals between key frames, according to a possible embodiment of the invention.

DETAILED DESCRIPTION

A multiple stream adaptive bit rate system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Media Stream Segmentation
      2.1.1 Media Stream Publishing
3.0 Implementation Mechanisms—Hardware Overview
4.0 Examples
5.0 Extensions and Alternatives

1.0 GENERAL OVERVIEW

This overview presents a basic description of some aspects of possible embodiments of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiments in a condensed and simplified format, and should be understood as merely a conceptual prelude to a more detailed description of example possible embodiments that follows below.

Adaptive Bit Rate delivery is commonly supported for live or linear sources (e.g., live TV channels, Live events, etc.), file based media sources (e.g., Video-on-Demand content or VoD), live events staged from pre-published canned (e.g., pre-packaged) videos, etc.

Figure 1:
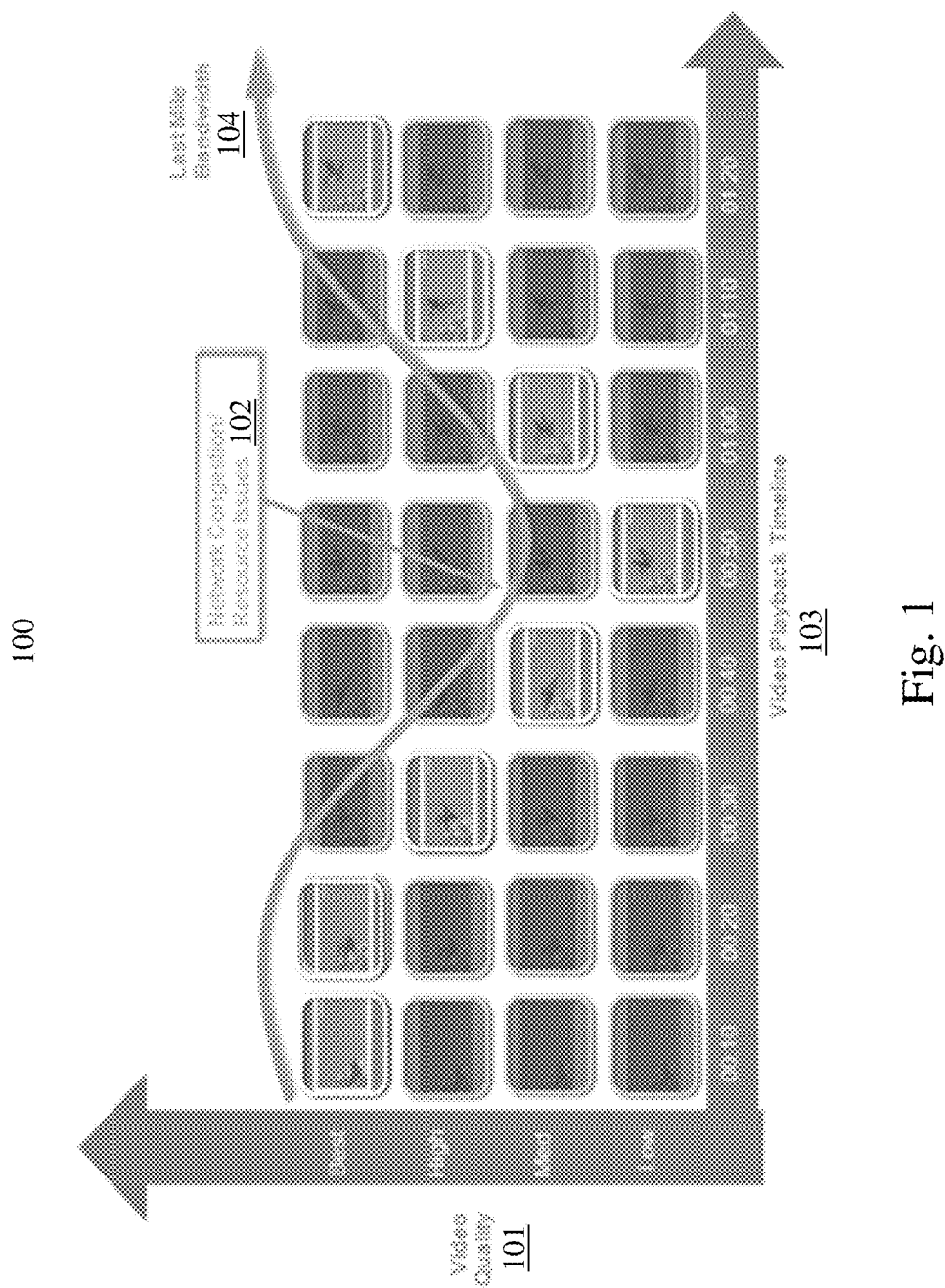
FIG. 1 illustrates a graphical representation of a selection of various quality media streams as last mile bandwidth changes, according to a possible embodiment of the invention.

As previously mentioned, many different approaches allowing for adaptive bit rate delivery have been introduced in the last few years geared towards solving problems related to the consumer viewing experience. Many of the approaches utilize a core technology that segments multiple media streams across all the bit rates (e.g., qualities) at discrete time intervals. For video, this segmentation has to happen at a key frame interval (e.g., Group of Pictures (GOP) interval). This allows a client player to seamlessly switch from one quality (bit rate) to another quality (bit rate) depending on the connection bandwidth and resource constraints. As such, the fundamental requirement is to have the key frames or GOP's aligned at the same positions (e.g., timestamps) across all the bit rate streams as shown in the FIG. 1. Each independent time portion of the media can be referred to as a segment, chunk, or fragment.

A client player receives a stream containing multiple segmented media streams where each segmented media stream is of a particular quality (bit rate) 101. As video playback time 103 progresses, many factors may affect the bandwidth across the last mile 104. Network congestion and/or resource issues 102 can cause the last mile bandwidth 104 to drop from the optimal bandwidth for the connection. As the client player detects that the last mile bandwidth is falling, the client player, at appropriate times, may switch from using one segmented media stream to another segmented media stream in order to provide the user with a smooth video viewing experience.

A possible embodiment enables an adaptive bit rate media publisher to receive (tune-in) and lock in to multiple live media bit rate streams and to segment the media bit rate streams for delivery as a single stream. In a typical broadcast environment, encoded media streams are packaged and delivered as MPEG-2 Transport Streams. The adaptive bit rate media publisher can tune-in to such streams and align itself at the correct positions in the future using a predictive mechanism before commencing the segmentation.

A possible embodiment includes a tune-in and locking mechanism for several live media streams of varying qualities or the streams could be from multiple camera angles or both, where the GOPs or key frame intervals occur at consistent time intervals (e.g., are predictable, such as occurring every n msecs).

A possible embodiment includes a tune-in and locking mechanism for several live media streams of varying qualities or the streams could be from multiple camera angles or both, where the GOPs or key frame intervals occur at unpredictable time intervals within a specified time window, but are consistent across the various rates (e.g., first GOP occurs at n msec, the next occurs at n+t1, the next at (2*n−t2), etc.).

A possible embodiment includes a tune-in and locking mechanism for several live media streams of varying qualities or the streams could be from multiple camera angles or both, where the GOPs or key frame intervals occur at consistent time intervals for multiple MPEG-2 SPTS streams (Single Program Transport Streams), both for unicast and multicast.

A possible embodiment includes a tune-in and locking mechanism for several live media streams of varying qualities or the streams could be from multiple camera angles or both, where the GOPs or key frame intervals occur at unpredictable time intervals within a specified time window, but are consistent across the various rates specifically for multiple MPEG-2 SPTS streams (Single Program Transport Streams), both for unicast and multicast.

A possible embodiment includes a tune-in and locking mechanism for several live media streams of varying qualities or the streams could be from multiple camera angles or both, where the GOPs or key frame intervals occur at consistent time intervals for multiple MPEG-2 MPTS streams (Multi Program Transport Streams), both for unicast and multicast.

A possible embodiment includes a tune-in and locking mechanism for several live media streams of varying qualities or the streams could be from multiple camera angles or both, where the GOPs or key frame intervals occur at unpredictable time intervals within a specified time window, but are consistent across the various rates specifically for multiple MPEG-2 MPTS streams (Multi Program Transport Streams), both for unicast and multicast A possible embodiment includes a tune-in and locking mechanism for situations where video and audio streams are sent separately (e.g., not as SPTS or MPTS)

A possible embodiment includes a tune-in and locking mechanism for any wireline or wireless delivery protocol, e.g., RTMP, RTSP, etc.

2.0 STRUCTURAL AND FUNCTIONAL OVERVIEW

2.1 Media Stream Segmentation 2.1.1 Media Stream Publishing

In a possible embodiment, in order to deliver live media streams to consumers using Adaptive Bit Rate (ABR) technology, a publishing system is provided that can receive, segment/fragment, and produce content that is appropriate to each device format. Of the few publishing systems in the market today which cater to ABR, all of them operate on the basis of grouping an encoder and segmenter in the same system/appliance. The encoder generates multiple streams and the segmenter in the same system consumes these streams and prepares them for ABR delivery.

Customers such as the Cable/Telco operators already have a significant investment in encoders that are capable of producing multiple media streams for live channels. For such scenarios it is viable to separate the encoding system from the publishing/segmenting system. Doing so allows much higher scalability in terms of performance of the publishing system and significant cost savings. However, separating a publishing system from an in-place encoding/publishing service gives rise to problems pertaining to syncing and locking in multiple media streams for the publisher to produce compliant fragments that are key-frame aligned. The possible embodiments of the invention described herein solve these problems.

Although reference is made to MPEG-2 transport streams herein, the described possible embodiments and extensions can easily be extended to any packaging or transport format. Additionally, although H.264/AAC media codecs are discussed herein, the described possible embodiments and extensions can easily be extended for any video/audio codec.

Figure 2:
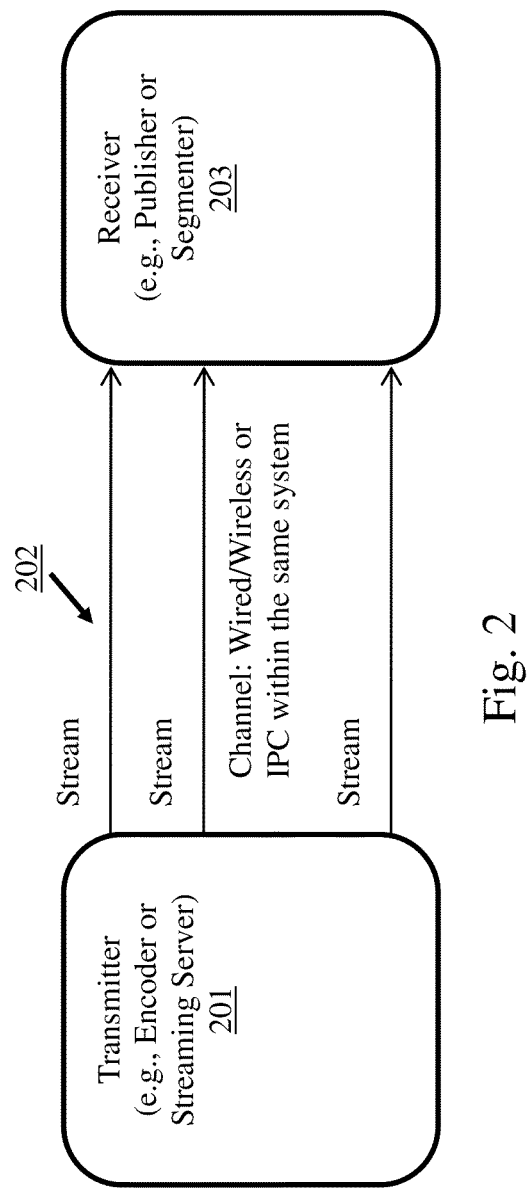
FIG. 2 illustrates a block diagram of a media stream transmitter and a receiver, according to a possible embodiment of the invention.

Referring to FIG. 2, a stream transmission source 201, such as an encoder or streaming server, sends streams of content across a communication channel such as a direct connection, wired connection (e.g., Ethernet, USB, etc.), wireless connection (e.g., 802.11x, tec.), IPC, data bus, etc. The connection could be across a network connection such as the Internet, intranet, etc. The streams 202 are of different qualities (bit rates) of the same content.

A receiver 203 can be a publisher, segmenter, etc. The receiver 203 receives the multiple streams from the stream transmission source 201. The receiver 203 processes the multiple streams and creates a single output stream containing the multiple streams where each of the multiple streams are segmented and placed at time intervals within the output stream. In an embodiment, the receiver 203 could create multiple output segmented streams from the multiple streams, where the segments are aligned in accordance with the time intervals. In an embodiment, each of the multiple streams could have a corresponding separate output segmented stream. This would result in the receiver 203 segmenting one input stream and aligning the segments in order to create one output segmented stream. In another embodiment, each of the multiple streams could have two corresponding output segmented streams. For example, the receiver 203 could split the audio and video streams from an input stream. The receiver 203 could segment the video stream and align the segments in one output segmented stream while segmenting the audio stream and aligning the segments in a second output stream. The receiver 203 could also receive a multiple bit rate input stream and separate and segment each bit rate substream out of the input stream and create an output segmented stream for each bit rate.

Figure 3:
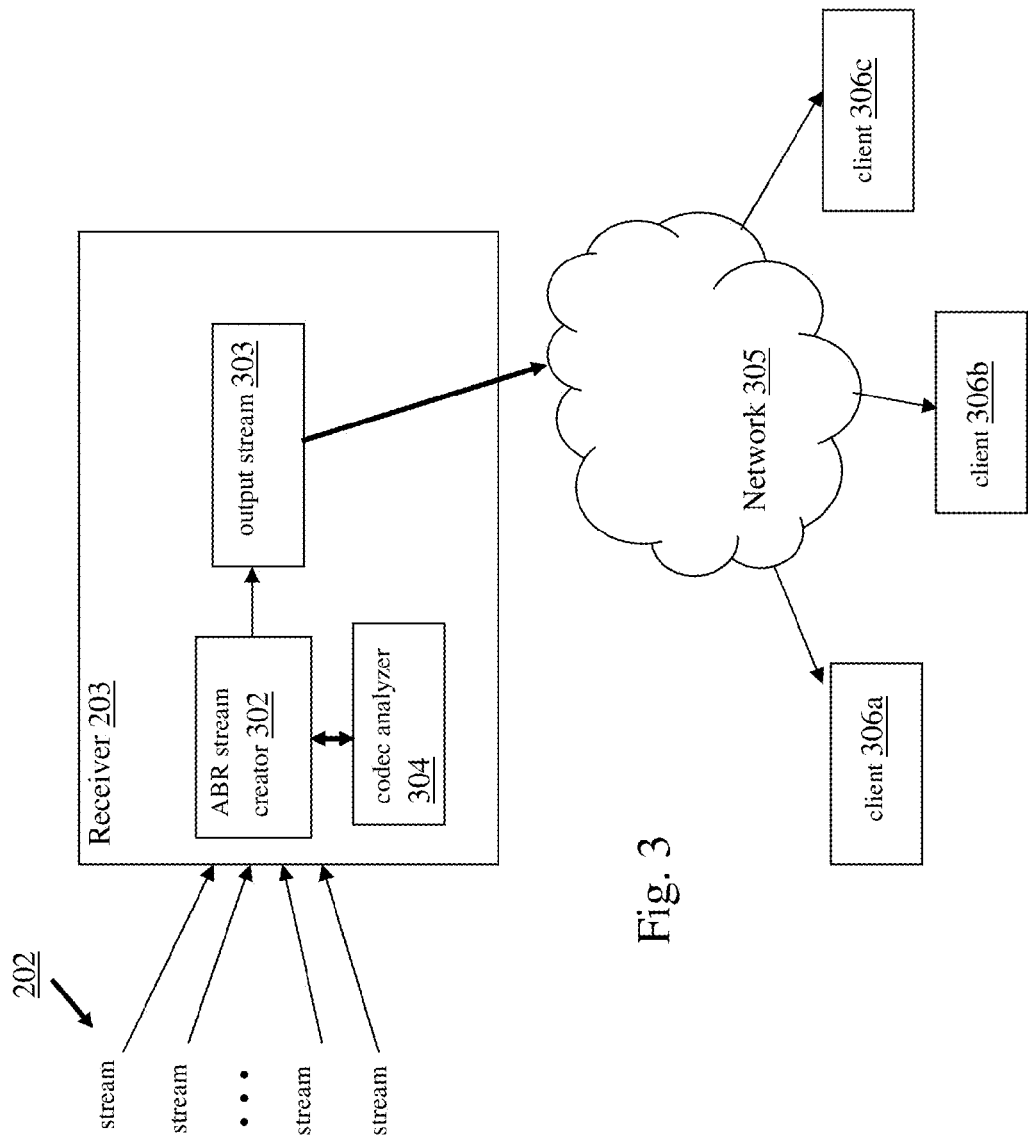
FIG. 3 illustrates a block diagram of a receiver assembling segmented media streams into an output stream, according to a possible embodiment of the invention.

Referring to FIG. 3, a receiver 203 structure is shown. In a possible embodiment, an adaptive bit rate (ABR) stream creator 302 resides in the receiver 203. As the streams 202 arrive at the receiver 203, the ABR stream creator 302 analyzes each stream and determines the key frames in each stream in order to synchronize all of the streams. Once the ABR stream creator 302 finds key frames for each stream, it creates the output stream 303 by placing segments of each stream into the output stream at consistent time intervals. The output stream can be partially buffered, stored for later delivery, or, after formatting for each client specific technology, immediately streamed out to client players 306a-306c over a network connection 305. The network connection can be over the Internet, intranet, etc. The client players decode and display segments of the output stream as described above.

Figure 4:
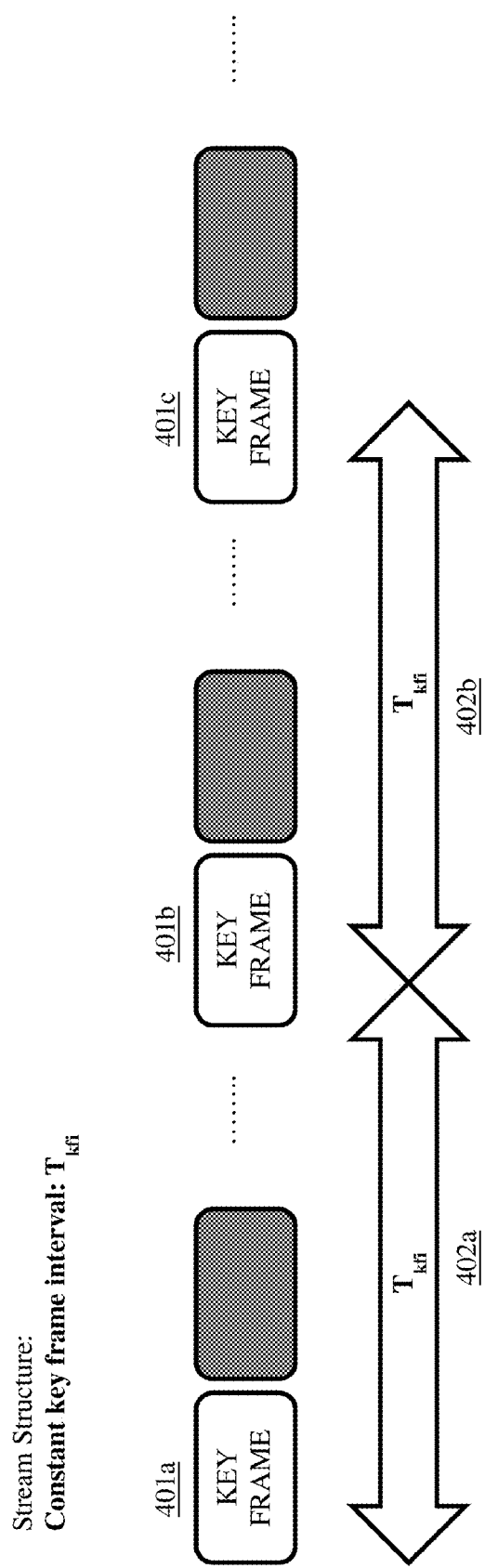
FIG. 4 illustrates a media stream with key frames occurring at constant intervals, according to a possible embodiment of the invention.
Figure 5:
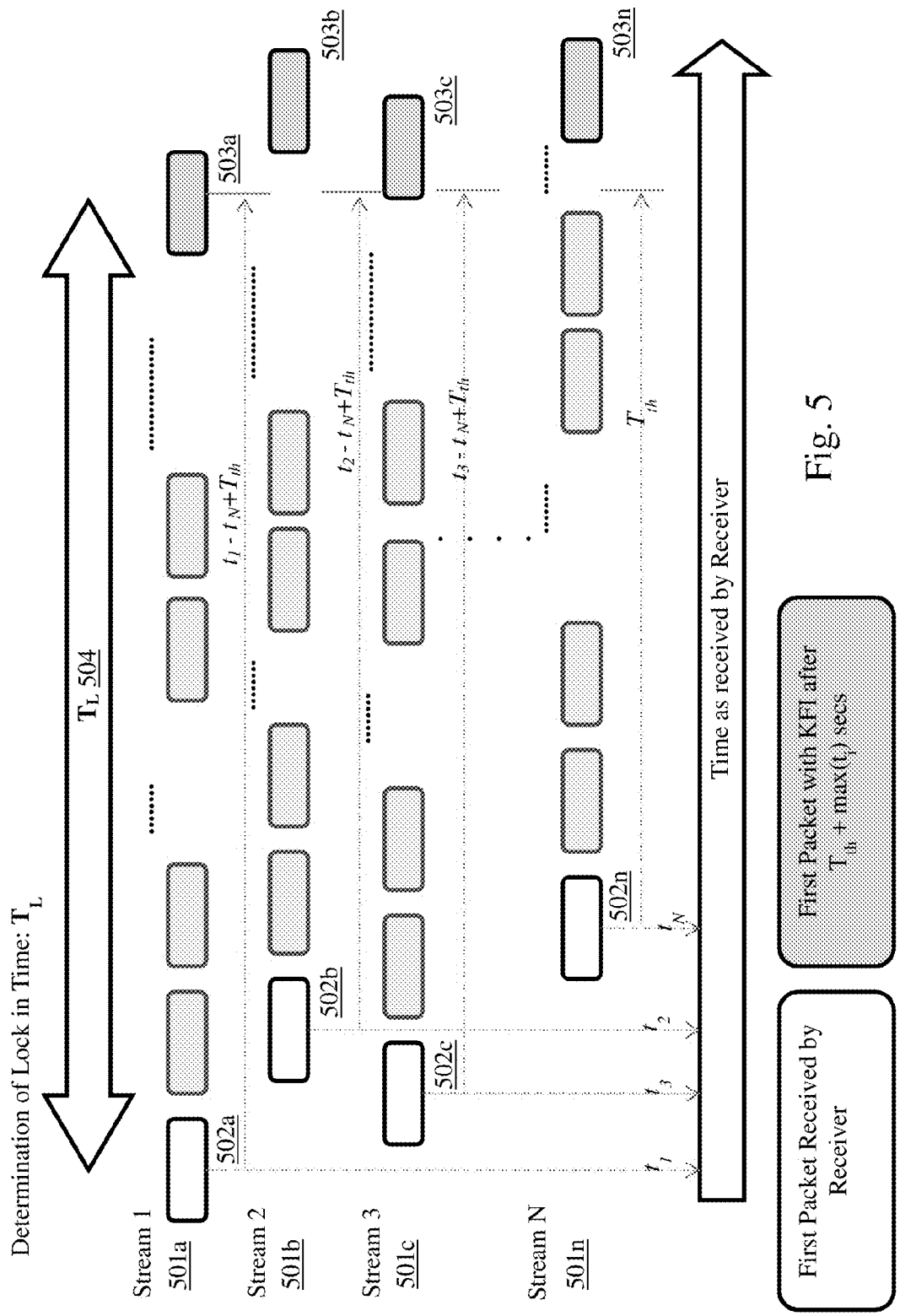
FIG. 5 illustrates an example of a calculation of a lock-in time frame, according to a possible embodiment of the invention.

In a possible embodiment, the ABR stream creator 302 tunes-in and locks into several live media streams of varying qualities. Alternatively, the streams could be from multiple camera angles or from both live media streams of varying qualities and multiple camera angles. Referring to FIG. 4, in this embodiment, the GOPs or key frames 401a-401c occur at intervals that are consistent or deterministic time intervals 402a-402b (e.g., they are predictable, such as occurring every 'n' msecs). Referring to FIG. 5, once the receiver 203 tunes-in and starts receiving multiple media streams 501a-501n, the ABR stream creator 302 calculates a unique sync timestamp in the future for all of the received media streams. This sync timestamp is set as some initial pre-determined offset (say $T_{th}$ seconds) from the current timestamp that is encountered by the receiver when it tuned into the streams.

Here, the device transmitting the multiple media streams is responsible for maintaining sync across all the bit rates so that receivers receive the media streams in a synchronous fashion. A small drift is acceptable among the received media streams. The final lock-in time $T_L$ 504 is determined as the latest of the first of the arrival times of key frames 502a-502n offset by $T_{th}$ seconds amongst all the received media streams 501a-501n. Assume that there are 'N' streams 501a-501n each with first arrival times $t_1, t_2, \ldots t_N$ of key frames 502a-502n. The lock-in time $T_L$ 504 is defined as:

$$T_L = T_{th} \max(t_i), \text{ where } 1 <= i <= N$$

Once all of the received media streams reach the specified lock-in time, $T_L$ 504, all of which can be at very different instances of time, media codec parsing by the codec analyzer 304 begins in each received media stream to check for the first occurrence of a key frame. This key frame is then chosen as the first sync point and accumulation and segmentation starts from this time onward across all of the received media streams. The ABR stream creator 302 places the segments into the output stream 303. Each segment for a specific bit rate is placed in the output stream 303 at specific time intervals for the output stream type. This ensures that the client player can find the appropriate bit rate in the output stream 303.

In this example, as the key frame boundaries are assumed to be deterministic in each received media stream and are consistent across all of the received media streams, the segmented chunks are frame and time stamp aligned across all bit rates. Also, during the initial lock in interval $T_L$, the codec analyzer 304 estimates the key frame intervals, bit rates, etc., for each received media stream.

If the codec analyzer 304 estimates that the key frame interval ($T_{kfi}$) 402a-402b is larger than the initial offset, then the ABR stream creator 302 revises the lock in time stamp to be an integral multiple of the key frame interval.

$$T_L = n * T_{kfi}, \text{ where n is an integer}$$

Once the ABR stream creator 302 reaches the revised lock in time stamp the ABR stream creator 302 can start segmenting the received media streams immediately and placing the segments in the output stream 303. If the codec analyzer 304 estimates that key frame intervals are much smaller than the initial offset, then the lock in time stamp is revised to an earlier value to allow for faster lock-in:

```
<---Lock-In Interval---><-Locked-In-><-Seg-1-> <-Seg-1->

Rx Str1-------------------Tth------------------Tk1--------Tk2------

Rx Str2-------------------Tth------------------Tk1--------Tk2------
```

Figure 6:
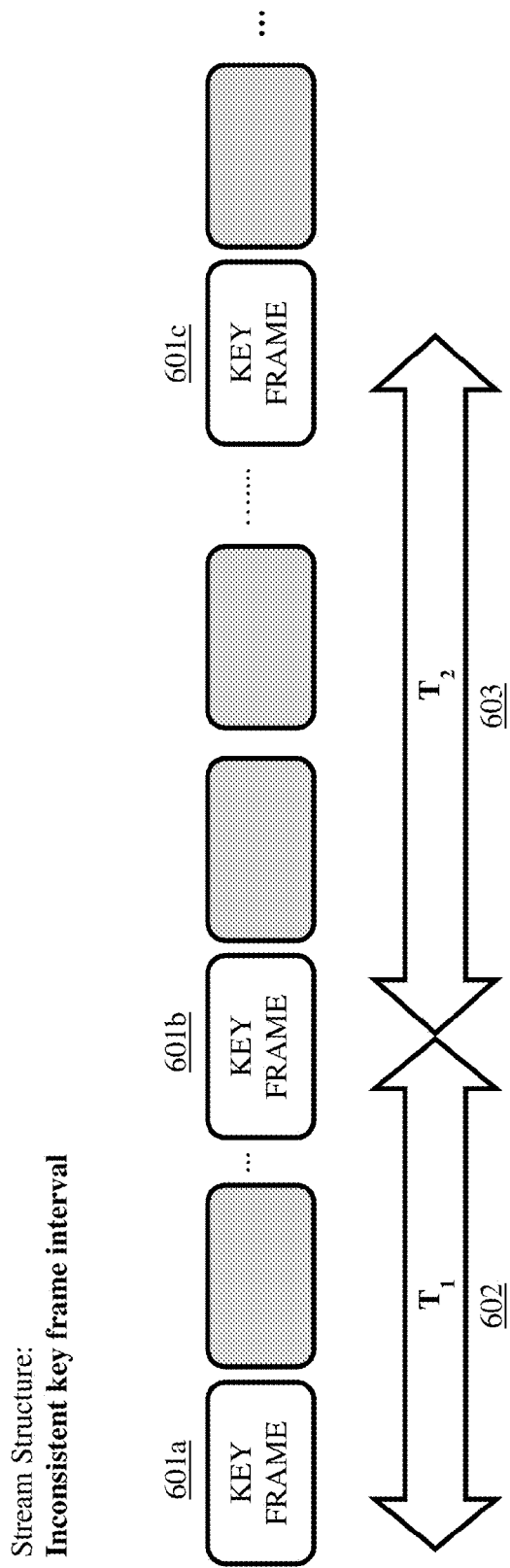
FIG. 6 illustrates a media stream with key frames occurring at inconsistent intervals, according to a possible embodiment of the invention.

Referring to FIG. 6, in a possible embodiment, the ABR stream creator 302 tunes-in and locks into several live media streams of varying qualities. Alternatively, the streams could be from multiple camera angles or from both live media streams of varying qualities and multiple camera angles. In this embodiment, the GOP boundaries or key frames 601a-601c occur at intervals that are at un-predictable non-deterministic time intervals 602, 603, within a specified time window, but are consistent across the various bit rates (e.g., first GOP occurs at 'n' msec, the next occurs at 'n+t1', the next at (2*n-t2), etc.).

The sync mechanism is the same as with the deterministic GOP case, above. Once sync is achieved, there is then a key frame check at every packet. Note that this is codec-dependent and parsers capable of understanding the media codec stream specification would be included in the codec analyzer 304.

Figure 7:
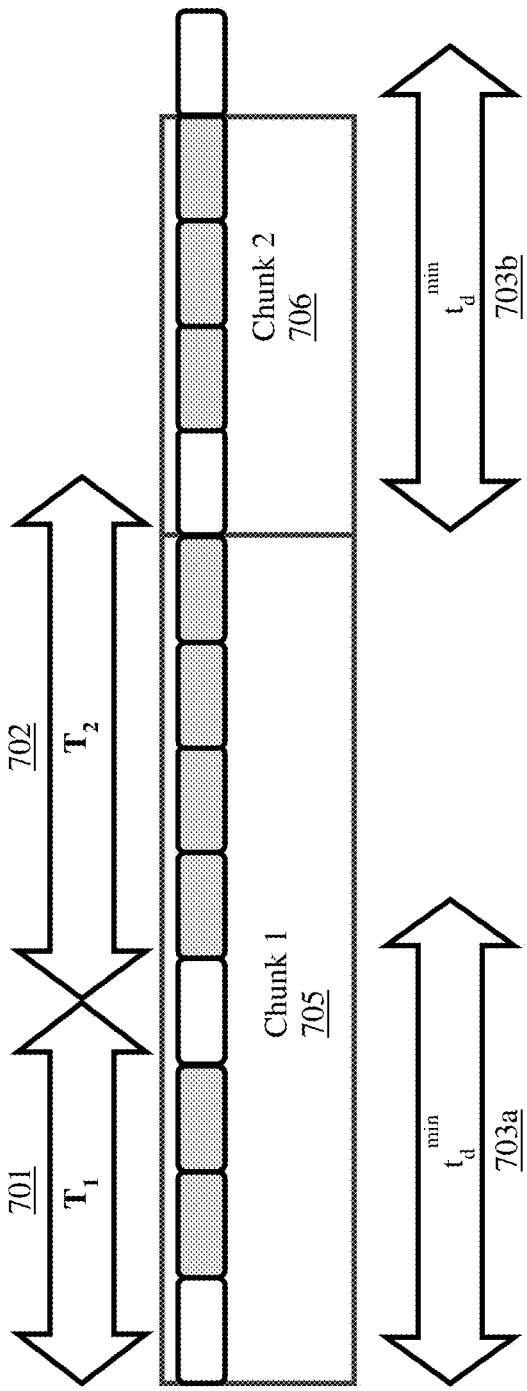
FIG. 7 illustrates a chunking mechanism for media streams with bounded, inconsistent time intervals between key frames, according to a possible embodiment of the invention.

Referring to FIG. 7, in a possible embodiment a maximum key-frame interval is determined by the ABR stream creator 302. The maximum key-frame interval would be determined to be a value where a key-frame would certainly occur in a specified time interval $t_{kfi}^{max}$ and $t_1$ 701, $t_2$ 702, $\ldots t_n < t_{kfi}^{max}$.

The media codec parsing by the codec analyzer 304 commences the search for a key-frame after a fraction 'δ' of the maximum key-frame interval period $t_{kfi}^{max}$ has passed. Define this time as $t_d^{min}$ 703a, 703b. The codec analyzer 304 waits until the next key-frame is obtained and packetizes all the frames in between. This way a chunk 705, 706, is assured to commence with a key-frame and will contain at least $t_d^{min}$ seconds of data. The chunk can utmost contain $t_d^{min} + t_{kfi}^{max} - (1/f)$ seconds of data, where f is the frame rate of the video stream in frames per seconds.

Chunks are placed in the output stream 303 by the ABR stream creator 302. The ABR stream creator places each chunk for a specific bit rate in the output stream at specific time intervals for the output stream type. The placement of the chunks in the output stream is determined by the nature of the client.

Referring to FIG. 8, in a possible embodiment, the key-frame interval 801, 802, is unbounded such that no range for it is specified. In this case, each chunk 804 is forced to contain a minimum duration of data, $t_d^{min}$ 803 which can be a constant or pre-determined value in seconds. After an amount (e.g., seconds) of data is accumulated for each chunk across all the streams, the codec analyzer 304 searches for the next key-frame. All frames until the next key frame are accumulated as a part of the present chunk until the codec analyzer 304 detects the next key-frame. This ensures that each chunk is of a reasonable duration and commences with a key-frame, thereby ensuring independent playback.

In a possible embodiment, the ABR stream creator 302 processes received multiple MPEG-2 Single Program Transport Streams (SPTS), for both unicast and multicast. As in the examples above for constant key frame intervals and inconsistent key frame intervals, the same or similar techniques are applicable when the multimedia stream is sent as a MPEG-2 SPTS. The ABR stream creator 302 periodically inspects each Program Association Table (PAT) and the associated Program Map Table (PMT) for each received media stream to obtain program identifiers that help identify the video or audio packets in the transport stream. Each single program in a media stream is described by the PAT and PMT. Time stamps for each received media stream are obtained from the program-time-stamp (PTS) field of the transport stream packet. The time stamp information is employed for syncing purposes as discussed above.

For key-frame identification, the codec analyzer 304 detects the nature of the frame which is present on receipt of a new frame. The arrival of a new frame is indicated by the payload unit start indicator in the transport stream header.

The time-stamp and frame-type inspection on receipt of every new frame by the codec analyzer 304 enables syncing and accumulation for streams with deterministic and non-deterministic GOPs as discussed above. The technique extends easily for unicast, multicast and broadcast scenarios.

In a possible embodiment, the ABR stream creator 302 processes received MPEG-2 Multi Program Transport Streams (MPTS). An MPTS is a collection of multiple SPTS streams. As above, the ABR stream creator 302 periodic inspection of each PAT and corresponding PMTs provides the program identifiers for all audio/video SPTS streams and elementary streams in each program. The ABR stream creator 302, upon such identification treats each program of the MPTS, similar to that of an SPTS as discussed above. Synchrony across various streams within a program is achieved as discussed above. Every program (live channel) is handled asynchronously by the ABR stream creator 302 as synchrony in time across various programs is not required.

In a possible embodiment, the ABR stream creator 302 processes video and audio streams that are sent separately (not as SPTS or MPTS). The typical situation where this scenario occurs is when the audio and video streams are related and sent separately. In a possible embodiment, multiple related audio and video streams can be received by receiver 203. The ABR stream creator 302 synchronizes the streams as discussed above by treating the individual audio and video streams as independent streams.

The lock-in time $T_L$ is selected by considering audio also as an independent stream, e.g., audio would also be considered one of the 'N' streams. For the chunking process, audio is treated as a slave to video. As in the examples above for constant key frame intervals and inconsistent key frame intervals, the key-frame interval determination and the duration of data in a chunk '$t_d$' can be decided on the basis of the video data collected. The corresponding audio data would be accumulated by the ABR stream creator 302 and, once $t_d$ is determined by the video stream, then $t_d$ seconds of the corresponding audio stream is packaged in the corresponding audio chunk. The video and audio chunks are placed in the output stream 303 by the ABR stream creator 302 where each chunk is placed in the output stream 303 at specific time intervals for the output stream type.

In a possible embodiment, the ABR stream creator 302 includes a re-syncing mechanism. The ABR stream creator 302 once in the sync state would be cognizant of the maximum time lags across various streams. Once the maximum time lag across various streams exceeds a relatively large lag, then the ABR stream creator 302 is sent into an async state. Once in this state, the ABR stream creator 302 follows the same syncing procedure as discussed above depending on the nature of the streams.

In a possible embodiment, the ABR stream creator 302 adapts to any wireline, wireless, or inter process delivery protocol, e.g., RTMP, RTSP, proprietary IPC messages, etc. or any multimedia codec.

In a possible embodiment, for the delivery protocol, the tune-in, syncing, and chunking mechanisms discussed above are applicable to protocols such as RTSP or RTMP. For example, for RTSP, the RTP header can carry the timestamps required to perform the syncing. For RTMP, the timestamps can be obtained from the message fields.

In a possible embodiment, the codec analyzer 304 is employed to identify the key frames in the video streams for syncing and chunking. The key-frame information can be obtained from any video codec on parsing. For example, in the case of H.264, parsing the access unit delimiters (AUDs), if present, can provide the requisite key-frame information. If the AUDs are not conclusive, then parsing the NAL-type of the initial NAL for IDR will conclusively convey whether a given video access unit (picture) is an IDR or not. Very similar techniques can be applied for MPEG2 PES, MPEG4—Part 2 video codec, or any other standard video codec.

This possible embodiment can process layered/scalable video codec versions. If the versions are only spatially scalable then the timestamp information for different bitstreams (layers) is uniform across the layers. If the versions are temporally scalable, then individual times of each of the layers can be obtained from the containers or associated delivery mechanisms. This is especially true for MPEG2TS. Regardless of the nature of scalability employed, video codec analysis can provide the requisite key-frame information which would be the same across various layers. Thus, lock-in, syncing, and chunking can be achieved using the same techniques for scalable video codecs as well. Regardless of the combination of audio/video codec and delivery protocol, the tune-in, syncing, and chunking mechanisms discussed above also apply to here.

In a possible embodiment, the ABR stream creator 302 includes a non-duplicating buffering scheme to accumulate multimedia data. The incoming streams, audio and video, received at any given instant need not have the same playback length (time). This would mean that either of the streams would have to be buffered to align to the same playback time (timestamp). As the aligned data is packetized and chunked into chunks of smaller durations, a typical receiver cannot buffer multimedia streams with a lag beyond the duration of a chunk without data duplication, e.g., having to store a duplicate copy of the lagging stream until it aligns with the other corresponding stream in playback time.

In this possible embodiment, the multimedia data being streamed is accumulated in a manner agnostic to the nature of the stream being sent. The ABR stream creator 302 constantly accumulates data whether it belongs to the audio or video component of the received multimedia streams. The buffer that operates on this input data employs the indices of each stream (audio/video) and employs the same block of memory for processing. In this manner, data can be accumulated asynchronously and packaged with time synchrony accommodating huge lags (in the order of 10 s of seconds) between the audio and video streams.

For example, for a 2 Mbps multimedia stream with a lag of four seconds between audio and video, 1 MB of memory would be required to buffer four seconds of data per stream. To handle hundreds of streams the memory build-up would be in the order of hundreds of MBs. Also, avoiding memory duplication also makes the system function faster in a time-critical application such as this one in handling live data.

3.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
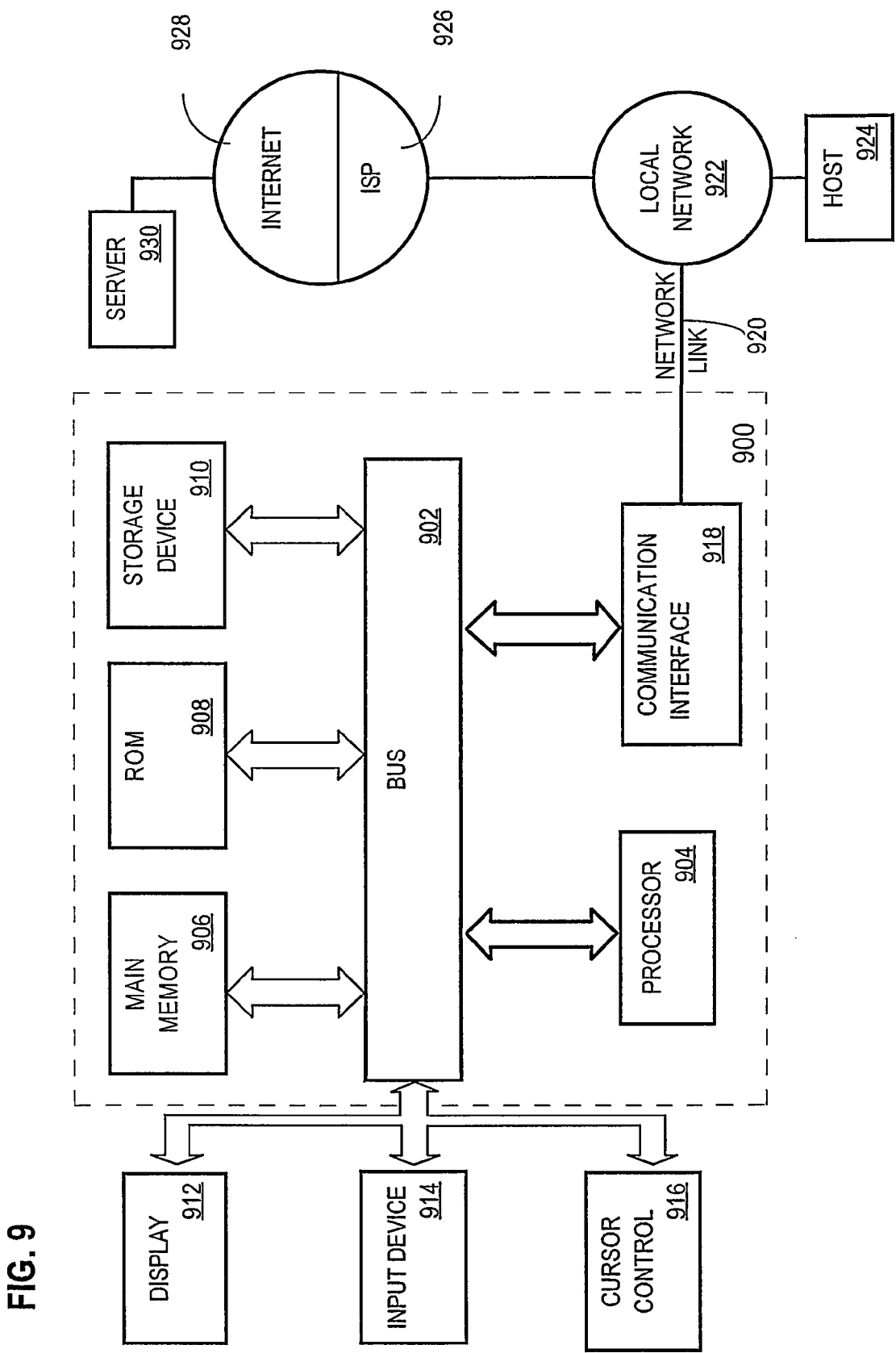
FIG. 9 illustrates a computer system upon which a possible embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

4.0 EXAMPLES

In an embodiment, a method comprises or a computer-readable storage medium carrying one or more sequences of instructions, wherein execution of the one or more sequences of instructions by one or more processors causes the one or more processors to perform the steps of: receiving a plurality of media streams, each media stream of differing bit rates for a specific content; determining a key frame in each of the plurality of received media streams; upon the determination of a key frame in each of the plurality of received media streams, inserting segments of each of the plurality of received media streams into an output stream at specific time intervals.

In an embodiment, a method or computer-readable storage medium further comprises calculating a lock-in time span; prior to the determination step, waiting a length of time equal to the lock-in time span.

In an embodiment, a method or computer-readable storage medium further comprises revising the lock-in time span when key frame intervals are shorter or longer than estimated.

In an embodiment, a method or computer-readable storage medium further comprises wherein the plurality of media streams are live media streams.

In an embodiment, a method or computer-readable storage medium further comprises wherein the plurality of media streams are media streams from a plurality of cameras.

In an embodiment, a method or computer-readable storage medium further comprises wherein the plurality of media streams include related audio and video streams.

In an embodiment, a method or computer-readable storage medium further comprises wherein intervals between key frames in each of the media streams in the plurality of media streams are constant.

In an embodiment, a method or computer-readable storage medium further comprises wherein intervals between key frames in at least one of the media streams in the plurality of media streams are unpredictable.

In an embodiment, a method or computer-readable storage medium further comprises wherein each segment contains at least one key frame.

In an embodiment, a method or computer-readable storage medium further comprises wherein the plurality of media streams include at least one of the following types of streams: H.264, AAC, MPEG-2 SPTS, or MPEG-2 MPTS.

In an embodiment, a method comprises or a computer-readable storage medium carrying one or more sequences of instructions, wherein execution of the one or more sequences of instructions by one or more processors causes the one or more processors to perform the steps of: receiving a plurality of multimedia streams, the plurality of multimedia streams include related multimedia streams; determining a key frame in a first multimedia stream of the plurality of received multimedia streams; inserting segments of the first multimedia stream into an output stream at specific time intervals; inserting segments of a second multimedia stream of the plurality of received multimedia streams into the output stream to align with the inserted segments of the first multimedia segments, the second multimedia stream is related to the first multimedia stream.

In an embodiment, a method or computer-readable storage medium further comprises adjusting a playback length of the second multimedia stream to match a playback length of the first multimedia stream by creating smaller segments of the second multimedia stream to be inserted into the output stream.

In an embodiment, an apparatus comprises: a media stream receiver that receives a plurality of media streams, each media stream of differing bit rates for a specific content; a key frame determination device that determines a key frame in each of the plurality of received media streams; upon the determination of a key frame in each of the plurality of received media streams, an output stream formatter device inserts segments of each of the plurality of received media streams into an output stream at specific time intervals.

In an embodiment, an apparatus further comprises a lock-in calculation device that calculates a lock-in time span; prior to the determination of a key frame in each of the plurality of received media streams, a delay device waits a length of time equal to the lock-in time span.

In an embodiment, an apparatus further comprises wherein the lock-in calculation device revises the lock-in time span when key frame intervals are shorter or longer than estimated.

In an embodiment, an apparatus further comprises wherein the plurality of media streams are live media streams.

In an embodiment, an apparatus further comprises wherein the plurality of media streams are media streams from a plurality of cameras.

In an embodiment, an apparatus further comprises wherein the plurality of media streams include related audio and video streams.

In an embodiment, an apparatus further comprises wherein intervals between key frames in each of the media streams in the plurality of media streams are constant.

In an embodiment, an apparatus further comprises wherein intervals between key frames in at least one of the media streams in the plurality of media streams are unpredictable.

In an embodiment, an apparatus further comprises wherein each segment contains at least one key frame.

In an embodiment, an apparatus further comprises wherein the plurality of media streams include at least one of the following types of streams: H.264, AAC, MPEG-2 SPTS, or MPEG-2 MPTS.

In an embodiment, an apparatus comprises: a media stream receiver that receives a plurality of multimedia streams, the plurality of multimedia streams include related multimedia streams; a key frame determination device that determines a key frame in a first multimedia stream of the plurality of received multimedia streams; an output stream formatter device inserts segments of the first multimedia stream into an output stream at specific time intervals; wherein the output stream formatter device inserts segments of a second multimedia stream of the plurality of received multimedia streams into the output stream to align with the inserted segments of the first multimedia segments, the second multimedia stream is related to the first multimedia stream.

In an embodiment, an apparatus further comprises a playback length adjustment device that adjusts a playback length of the second multimedia stream to match a playback length of the first multimedia stream by creating smaller segments of the second multimedia stream to be inserted into the output stream.

5.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving, by a device, a plurality of media streams,
   each media stream being associated with a different bit rate for a particular content;
determining, by the device, key frames associated with the plurality of received media streams,
   each key frame being associated with a particular received media stream of the plurality of received media streams, and
   each key frame being associated with a respective arrival time;
determining, by the device and based on the respective arrival time associated with each key frame, a lock-in time based on a last received key frame of the determined key frames;
determining, by the device and when each of the plurality of media streams reaches the lock-in time, a first occurrence of a key frame of the determined key frames; and
inserting, by the device and based on the first occurrence of the key frame, segments of each of the plurality of received media streams into an output stream at specific time intervals.

2. The method of claim 1, further comprising:
revising the lock-in time; and
using the revised lock-in time to determine the first occurrence of the key frame.

3. The method of claim 2, further comprising:
revising the lock-in time when one or more key frame intervals are different than an initial offset.

4. The method of claim 1, further comprising:
time-aligning at least one of the key frames across segments of each of the plurality of received media streams prior to inserting the segments into the output stream.

5. The method of claim 1, where the plurality of media streams are live media streams.

6. The method of claim 1, where the plurality of media streams are media streams from a plurality of cameras.

7. The method of claim 1, where the plurality of media streams include related audio and video streams.

8. The method of claim 1, where the respective arrival times of the key frames are constant.

9. The method of claim 1, where each segment contains at least one key frame.

10. The method of claim 1, where the plurality of media streams include at least one of the following types of streams: H.264, AAC, MPEG-2 SPTS, or MPEG-2 MPTS.

11. A method comprising:
receiving, by a device, a plurality of multimedia streams, the plurality of multimedia streams including related multimedia streams;
determining, by the device, a key frame associated with each multimedia stream of the plurality of received multimedia streams,
   each key frame being associated with a particular received media stream of the plurality of received media streams, and
   each key frame being associated with a respective arrival time;
determining, by the device and based on the respective arrival time associated with each key frame, a lock-in time based on a last received key frame of the determined key frames;
determining, by the device and when each of the plurality of media streams reaches the lock-in time, a first occurrence of a key frame of the determined key frames;
inserting, by the device and based on the first occurrence of the key frame, segments of a first multimedia stream, of the plurality of received multimedia streams, into an output stream; and
inserting, by the device and based on the first occurrence of the key frame, segments of a second multimedia stream, of the plurality of received multimedia streams, into the output stream to align with the inserted segments of the first multimedia stream.

12. The method of claim 11, further comprising:
adjusting a playback length of the second multimedia stream to match a playback length of the first multimedia stream by creating smaller segments of the second multimedia stream for insertion into the output stream.

13. A non-transitory computer readable storage medium storing instructions, the instructions comprising:
one or more instructions which, when executed by at least one processor, cause the at least one processor to:
   receive a plurality of media streams,
      each media stream being associated with a different bit rate for particular content;
   determine key frames associated with the plurality of received media streams,
      each key frame being associated with a particular received media stream of the plurality of received media streams, and
      each key frame being associated with a respective arrival time;
   determine, based on the respective arrival time associated with each key frame, a lock-in time based on a last received key frame of the determined key frames;
   determine, when each of the plurality of media streams reaches the lock-in time, a first occurrence of a key frame of the determined key frames; and
   insert, based on the first occurrence of the key frame, segments of each of the plurality of received media streams into an output stream at specific time intervals.

14. The non-transitory computer readable storage medium of claim 13, where the instructions further comprise:

one or more instructions to revise the lock-in time; and
one or more instructions to use the revised lock-in time to determine the first occurrence of the key frame.

15. The non-transitory computer readable storage medium of claim 14, where the instructions further comprise:
one or more instructions to revise the lock-in time when one or more key frame intervals are different than an initial offset.

16. The non-transitory computer readable storage medium of claim 13, where the instructions further comprise:
one or more instructions to time-align at least one of the key frames across segments of each of the plurality of received media streams prior to inserting the segments into the output stream.

17. The non-transitory computer readable storage medium of claim 13, where the plurality of media streams are live media streams.

18. The non-transitory computer readable storage medium of claim 13, where the plurality of media streams are media streams from a plurality of cameras.

19. The non-transitory computer readable storage medium of claim 13, where the plurality of media streams include related audio and video streams.

20. The non-transitory computer readable storage medium of claim 13, where the respective arrival times of the key frames are constant.

21. The non-transitory computer readable storage medium of claim 13, where each segment contains at least one key frame.

22. The non-transitory computer readable storage medium of claim 13, where the plurality of media streams include at least one of the following types of streams: H.264, AAC, MPEG-2 SPTS, or MPEG-2 MPTS.

23. A non-transitory computer readable storage medium storing instructions, the instructions comprising:
one or more instructions which, when executed by at least one processor, cause the at least one processor to:
receive a plurality of multimedia streams,
the plurality of multimedia streams including related multimedia streams;
determine a key frame associated with each multimedia stream of the plurality of received multimedia streams,
each key frame being associated with a particular received media stream of the plurality of received media streams, and
each key frame being associated with a respective arrival time;
determine, based on the respective arrival time associated with each key frame, a lock-in time based on a last received key frame of the determined key frames;
determine, when each of the plurality of media streams reaches the lock-in time, a first occurrence of a key frame of the determined key frames;
insert, based on the first occurrence of the key frame, segments of a first multimedia stream, of the plurality of received multimedia streams, into an output stream; and
insert, based on the first occurrence of the key frame, segments of a second multimedia stream, of the plurality of received multimedia streams, into the output stream to align with the inserted segments of the first multimedia stream.

24. The non-transitory computer readable storage medium of claim 23, where the instructions further comprise:
one or more instructions to adjust a playback length of the second multimedia stream to match a playback length of the first multimedia stream by creating smaller segments of the second multimedia stream for insertion into the output stream.

25. A system comprising:
one or more devices to:
receive a plurality of media streams,
each media stream being associated with a different bit rate for particular content;
determine key frames associated with the plurality of received media streams,
each key frame being associated with a particular received media stream of the plurality of received media streams, and
each key frame being associated with a respective arrival time;
determine, based on the respective arrival time associated with each key frame, a lock-in time based on a last received key frame of the determined key frames;
determine, when each of the plurality of media streams reaches the lock-in time, a first occurrence of a key frame of the determined key frames; and insert, based on the first occurrence of the key frame, segments of each of the plurality of received media streams into an output stream at specific time intervals.

26. The system of claim 25, where the one or more devices are further to:
revise the lock-in time; and
use the revised lock-in time to determine the first occurrence of the key frame.

27. The system of claim 26, the one or more devices are further to:
revise the lock-in time when one or more key frame intervals are different than an initial offset.

28. The system of claim 25, where the one or more devices are further to:
time-align at least one of the key frames across segments of each of the plurality of received media streams prior to inserting the segments into the output stream.

29. The system of claim 25, where the plurality of media streams are live media streams.

30. The system of claim 25, where the plurality of media streams are media streams from a plurality of cameras.

31. The system of claim 25, where the plurality of media streams include related audio and video streams.

32. The system of claim 25, where the respective arrival times of the key frames are constant.

33. The system of claim 25, where each segment contains at least one key frame.

34. The system of claim 25, where the plurality of media streams include at least one of the following types of streams: H.264, AAC, MPEG-2 SPTS, or MPEG-2 MPTS.

35. A system comprising:
one or more devices to:
receive a plurality of multimedia streams, the plurality of multimedia streams including related multimedia streams;
determine a key frame associated with each multimedia stream of the plurality of received multimedia streams,
each key frame being associated with a particular received media stream of the plurality of received media streams, and
each key frame being associated with a respective arrival time;
determine, based on the respective arrival time associated with each key frame, a lock-in time based on a last received key frame of the determined key frames;

determine, when each of the plurality of media streams reaches the lock-in time, a first occurrence of a key frame of the determined key frames insert, based on the first occurrence of the key frame, segments of a first multimedia stream, of the plurality of received multimedia streams, into an output stream; and insert, based on the first occurrence of the key frame, segments of a second multimedia stream, of the plurality of received multimedia streams, into the output stream to align with the inserted segments of the first multimedia stream.

36. The system of claim 35, where the one or more devices are further to:

adjust a playback length of the second multimedia stream to match a playback length of the first multimedia stream by creating smaller segments of the second multimedia stream for insertion into the output stream.

* * * * *